United States Patent
Hirano

(10) Patent No.: US 9,836,194 B2
(45) Date of Patent: Dec. 5, 2017

(54) DESKTOP INFORMATION PROCESSING APPARATUS AND DISPLAY METHOD FOR THE SAME

(71) Applicant: TOSHIBA TEC KABUSHIKI KAISHA, Shinagawa-ku, Tokyo (JP)

(72) Inventor: Takahisa Hirano, Shizuoka-ken (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 267 days.

(21) Appl. No.: 14/219,371

(22) Filed: Mar. 19, 2014

(65) Prior Publication Data
US 2015/0268835 A1 Sep. 24, 2015

(51) Int. Cl.
*G06F 3/0484* (2013.01)
*G06F 3/0488* (2013.01)
*G06F 3/0486* (2013.01)

(52) U.S. Cl.
CPC ........ *G06F 3/04842* (2013.01); *G06F 3/0486* (2013.01); *G06F 3/0488* (2013.01); *G06F 2203/04803* (2013.01)

(58) Field of Classification Search
CPC .................................. G06F 3/04842
USPC ....................................... 715/769
See application file for complete search history.

(56) References Cited

U.S. PATENT DOCUMENTS

| | | | | |
|---|---|---|---|---|
| 5,446,842 A | * | 8/1995 | Schaeffer | G06Q 10/10 709/205 |
| 5,764,227 A | * | 6/1998 | Ishimine | G06F 3/0483 715/207 |
| 7,249,314 B2 | * | 7/2007 | Walker | G06F 17/24 715/205 |
| 7,856,473 B2 | * | 12/2010 | Horikiri | H04L 29/06027 709/204 |

(Continued)

OTHER PUBLICATIONS

Mahyar et al., CoSpaces: Workspaces to Support Co-located Collaborative Visual Analytics, Workshop on Data Exploration for Interactive Surfaces DEXIS 2011, pp. 36-39, available at https://hal.archives-ouvertes.fr/hal-00659469/document#page=39 (May 2012).*

(Continued)

*Primary Examiner* — Doon Chow
*Assistant Examiner* — Conrad Pack
(74) *Attorney, Agent, or Firm* — Amin, Turocy & Watson LLP

(57) ABSTRACT

In accordance with one embodiment, a desktop information processing apparatus allowed to be simultaneously used by a plurality of users comprises a plurality of operation display sections and a control section. The plurality of operation display sections, each of which has a display surface on the top plate of the desktop information processing apparatus, detect touch operations of users, respectively. Further, the operation display sections are allocated to each user. The control section conducts a control to display same file data in a pre-defined first display area on all the operation display (Continued)

sections. The control section conducts a control to display, when a user carries out a touching and moving operation on the file data on one of the plurality of operation display sections, the track of the movement on the touched operation display section but not on the other operation display sections.

12 Claims, 18 Drawing Sheets

(56) References Cited

U.S. PATENT DOCUMENTS

| | | | |
|---|---|---|---|
| 2004/0046784 A1* | 3/2004 | Shen | G06F 3/048 715/733 |
| 2005/0034079 A1* | 2/2005 | Gunasekar | G06F 17/289 715/753 |
| 2006/0001645 A1* | 1/2006 | Drucker | G06F 3/017 345/156 |
| 2007/0011231 A1* | 1/2007 | Manion | H04L 12/1827 709/204 |
| 2007/0124737 A1* | 5/2007 | Wensley | G06F 9/546 719/314 |
| 2008/0005244 A1* | 1/2008 | Vernon | G06Q 10/10 709/204 |
| 2008/0256461 A1* | 10/2008 | Aksemit | G06F 1/16 715/753 |
| 2011/0231795 A1* | 9/2011 | Cheon | G06F 1/3231 715/810 |
| 2011/0270824 A1* | 11/2011 | Morris | G06F 17/30991 707/722 |
| 2012/0079399 A1* | 3/2012 | Ferman | G06Q 10/109 715/753 |
| 2012/0284642 A1* | 11/2012 | Sitrick | G06F 17/241 715/753 |
| 2014/0108544 A1* | 4/2014 | Lewis | H04W 4/026 709/204 |

OTHER PUBLICATIONS

Mahyar et al., Observations of record-keeping in co-located collaborative analysis, 2013 46th Hawaii International Conference on System Sciences (HICSS), pp. 460-469, available at http://www.computer.org/csdl/proceedings/hicss/2013/4892/00/4892a460.pdf (2013).*

WebEx Meeting Center User Guide—for Hosts, Presenters, and Participants, Cisco, pp. 1-16 (Feb. 2, 2013).*

* cited by examiner

| | 701 | 702 | 703 | 704 | 705 | 706 | 707 DOCUMENT FILE | | |
|---|---|---|---|---|---|---|---|---|---|
| | User ID | LANGU-AGE | MASTER | TERMINAL NAME | PRESE-NTER | CURRENT FILE | | | |
| | User A | ENGLISH | 1 | C1 | 1 | sheetA3.ppt | sheetA1.ppt | sheetA2.ppt | sheetA3.ppt | ... |
| | User B | ENGLISH | 0 | C2 | 0 | sheetB1.ppt | sheetB1.ppt | sheetB2.pdf | sheetB3.doc | ... |
| | User C | ENGLISH | 0 | C3 | 0 | sheetC2.ppt | sheetC1.pdf | sheetC2.ppt | sheetC3.ppt | ... |
| | User D | ENGLISH | 0 | C4 | 0 | sheetD1.ppt | sheetD1.ppt | sheetD2.doc | sheetD3.doc | ... |
| | User E | ENGLISH | 0 | C5 | 0 | SheetE1.ppt | sheetE1.ppt | sheetE2.doc | sheetE3.jpg | ... |
| | User F | ENGLISH | 0 | C6 | 0 | sheetF1.ppt | sheetF1.ppt | sheet F2.ppt | - | ... |
| | User G | ENGLISH | 0 | C7 | 0 | - | - | - | - | ... |
| | User H | ENGLISH | 0 | C8 | 0 | - | - | - | - | ... |
| | User I | JAPAN-ESE | 0 | T1 | 0 | sheetI1.ppt | sheetI1.ppt | sheetI2.ppt | - | ... |
| | User J | JAPAN-ESE | 0 | T2 | 0 | - | - | - | - | ... |
| | User K | FRENCH | 0 | T3 | 0 | sheetK1.ppt | sheetK1.pdf | sheetK2.pdf | - | ... |
| | User L | JAPAN-ESE | 0 | T4 | 0 | - | - | - | - | ... |

| DOCUMENT FILE | OWNER | SHARER | | | | | | | | | | |
|---|---|---|---|---|---|---|---|---|---|---|---|---|
| sheetA1.ppt | UserA | UserB | UserD | - | - | - | - | - | - | - | - | - |
| sheetA2.ppt | UserA | UserB | UserC | UserD | UserE | UserF | UserG | UserH | UserI | UserJ | UserK | UserL |
| sheetA3.ppt | UserA | UserD | - | - | - | - | - | - | - | - | - | - |
| sheetB1.ppt | UserB | UserC | UserC | - | - | - | - | - | - | - | - | - |
| sheetB2.ppt | UserB | UserA | UserC | - | - | - | - | - | - | - | - | - |
| sheetB3.ppt | UserB | UserC | - | - | - | - | - | - | - | - | - | - |
| sheetC1.ppt | UserC | UserB | UserI | UserJ | - | - | - | - | - | - | - | - |
| sheetC2.ppt | UserC | UserB | UserI | UserJ | - | - | - | - | - | - | - | - |
| sheetC3.ppt | UserC | UserK | - | - | - | - | - | - | - | - | - | - |
| sheetD1.ppt | UserD | UserA | UserB | UserL | - | - | - | - | - | - | - | - |
| sheetD2.ppt | UserD | UserA | - | - | - | - | - | - | - | - | - | - |
| sheetD3.ppt | UserD | UserA | UserB | UserC | UserE | UserF | UserG | UserH | UserI | UserJ | UserK | UserL |
| ⋮ | ⋮ | ⋮ | ⋮ | ⋮ | ⋮ | ⋮ | ⋮ | ⋮ | ⋮ | ⋮ | ⋮ | ⋮ |

| OBJECT ID ↗751 | USER ID ↗752 | DOCUMENT FILE ↗753 | COLOR ↗754 | LINE TYPE ↗755 | POSITION INFORMATION ↗756 |
|---|---|---|---|---|---|
| 000001 | UserA | sheetA1.ppt | black | 1 | (5,36) (6,36) (7,37) (8,37)··· |
| 000002 | UserA | sheetA1.ppt | blue | 2 | (506,105) (507,106) (508,106) (509,105)··· |
| 000003 | UserA | sheetB2.ppt | black | 2 | ⋮ |
| 000004 | UserA | sheetF2.ppt | red | 1 | ⋮ |
| 000005 | UserB | sheetA1.ppt | blue | 1 | ⋮ |
| 000006 | UserB | sheetA2.ppt | blue | 3 | ⋮ |
| 000007 | UserB | sheetA2.ppt | red | 1 | ⋮ |
| 000008 | UserB | sheetF1.ppt | green | 1 | ⋮ |
| 000009 | UserB | sheetI1.ppt | blue | 2 | ⋮ |
| 000010 | UserJ | sheetF1.ppt | black | 1 | ⋮ |
| 000011 | UserC | sheetA1.ppt | blue | 3 | ⋮ |
| ⋮ | | | | | ⋮ |

245

DESKTOP INFORMATION PROCESSING APPARATUS AND DISPLAY METHOD FOR THE SAME

FIELD

Embodiments described herein relate to an information processing apparatus provided with a touch panel display.

BACKGROUND

A touch panel display has been used in a portable terminal apparatus or a notebook computer as a user interface in recent years. Further, a desktop information sharing system is being developed which is equipped with a big touch panel display and capable of achieving a multi-person conference or a brief meeting.

Conventionally, during a conference or presentation, the presenter generally uses a projector and the like as a sharing tool. The documents to be used in a presentation are printed out for preparation. Participants write down their ideas and opinions on the content presented on the printed documents distributed to them.

The printout of documents and distribution of the documents to participants requires a print job and is therefore time-consuming and labor-consuming. Moreover, if the presentation involves a confidential document, for the sake of confidentiality, the document cannot be printed out for preparation. In this case, in the conventional conference, participants can only appreciate the content by watching a sharing tool such as a projector at a distance, resulting in a diminished understanding and thinking ability. Additionally, for a document of high confidentiality, participants can hardly record their thoughts or opinions, and can only memorize them, leading to problems which are sometimes difficult to deal with.

BRIEF DESCRIPTION OF THE DRAWINGS

FIG. 14 is a diagram illustrating an example of the configuration of conference management data according to an embodiment;

FIG. 15 is a diagram illustrating an example of the configuration of sharing management data according to an embodiment;

FIG. 16 is a diagram illustrating an example of the configuration of handwritten data according to an embodiment;

DETAILED DESCRIPTION

Figure 1:
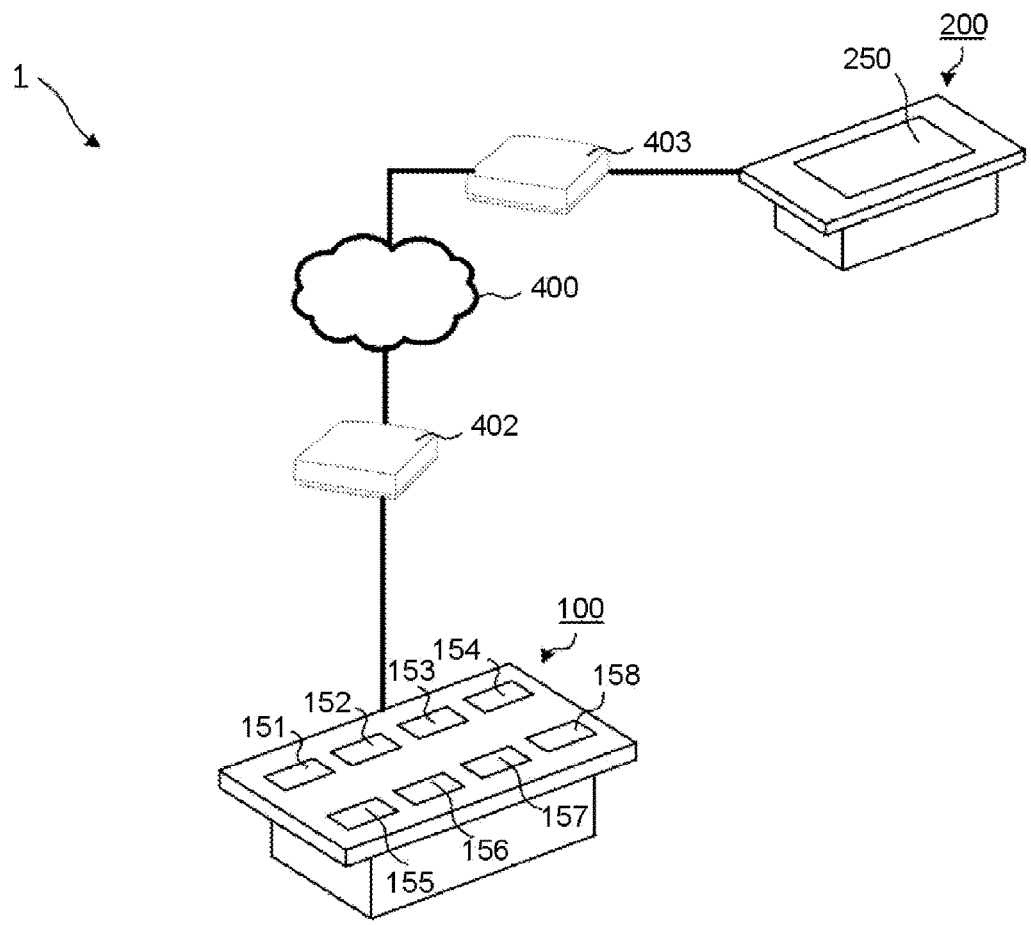
FIG. 1 is a diagram illustrating an example of the configuration of a system according to an embodiment.

In accordance with one embodiment, a desktop information processing apparatus allowed to be simultaneously used by a plurality of users comprises a plurality of operation display sections and a control section. The plurality of operation display sections, each of which has a display surface on the top plate of the desktop information processing apparatus, detect touch operations of users, respectively. Further, the operation display sections are allocated to each user. The control section conducts a control to display same file data in a pre-defined first display area on all the operation display sections. The control section conducts a control to display, when a user carries out a touching and moving operation on the file data on one of the plurality of operation display sections, the track of the movement on the touched operation display section but not on the other operation display sections.

Either or both of a desktop information processing apparatus having a plurality of touch panel displays and a desktop information processing apparatus having one big touch panel display are used in embodiments described herein. In the case of the use of the desktop information processing apparatus having one big touch panel display, a display area is segmented into screens for use by a plurality of users.

Conference participants touch the screen of a touch panel arranged on the top plate surface of the desktop information processing apparatus to carry out an operation. The touch panel is capable of displaying a plurality of document files simultaneously and confirming all the document files shared.

In a conference, the desktop information apparatus described herein displays document files of the user (presenter) currently giving a presentation in the biggest area (presentation area) of display areas. Further, the name of the user currently giving a presentation is displayed in a highlighted manner so that the user can be known at a glance.

Further, the participants touch the touch panel display and carry out a moving touching operation to write on the currently presented document file. The data handwritten by a participant is displayed on the touch panel display used by the participant but not on the touch panel displays used by the other participants.

The user (master) in charge of the conference can designate the presenter and endows the presenter with a presentation right. Further, a participant can gain a presentation right by moving his/her document file into the presentation area. The participant can use any tool by moving his/her document file onto icon images on a screen.

Further, a participant can distribute the document file prepared by himself/herself to a specific participant by moving the document file to a list on the screen. In addition, a participant can distribute the document file prepared by himself/herself to all participants by moving the document file onto a predefined specific icon image.

The desktop information processing apparatus described herein has a translation function to translate the displayed content data, which is a foreign language for participants, and display the translated data.

With such a configuration, a screen can be shared without diminishing the thinking ability of participants.

FIG. 1 is a schematic diagram illustrating the configuration of a system according to an embodiment. In accordance with an embodiment, a system 1 comprises two desktop information processing apparatuses 100 and 200. As an implementation mode of the present invention, the desktop information processing apparatus 100 is arranged in the conference room of the headquarters of a company while the desktop information processing apparatus 200 is arranged in the conference room of a branch company. The desktop information processing apparatuses 100 and 200 send and receive data via a wide area network 400 and routers 402 and 403.

The desktop information processing apparatus 100 has a plurality of touch panel displays 151-158 which can display different contents respectively. The touch panel displays 151-158 have a display surface on the top plate of the desktop information processing apparatus 100.

The desktop information processing apparatus 200 has a flat top plate surface on which a big touch panel display 250 is arranged.

Figure 2:
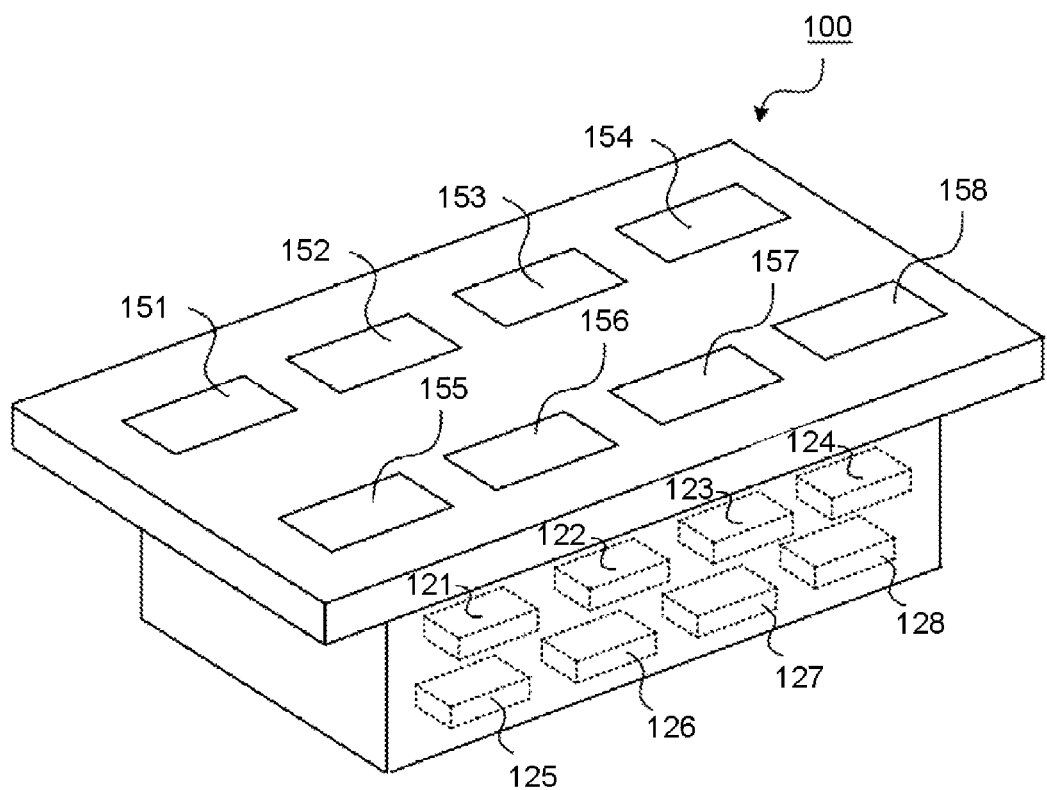
FIG. 2 is an oblique view illustrating an example of the configuration of a desktop information processing apparatus according to an embodiment.

FIG. 2 is a diagram illustrating the appearance of the desktop information processing apparatus 100 according to the embodiment and a perspective view for a part of the desktop information processing apparatus 100. The desktop information processing apparatus 100, which is an information processing apparatus of a table type, has a plurality of touch panel displays 151-158 for operation display on the flat top plate surface thereof. The touch panel displays 151-158 are arranged at positions corresponding to seats of conference participants. The desktop information processing apparatus 100 has a plurality of control sections 121-128 corresponding to the touch panel displays 151-158. The control sections 121-128 are all computer systems. In this embodiment, it is set that in the control sections 121-128 and the touch panel displays 151-158, the control section and the touch panel display having the same numeral as the last digit of the reference mark are in a correspondence relation. For example, the control section 121 controls the display operation of the touch panel display 151, and the control section 122 controls the touch panel display 152. Further, there may be only one control section, but not a plurality of control sections 121-128, for controlling the display operation of the touch panel displays 151-158. Further, the desktop information processing apparatus may have one control section in which a plurality of virtual machines are arranged to control the display of the touch panel displays 151-158 respectively.

Figure 3:
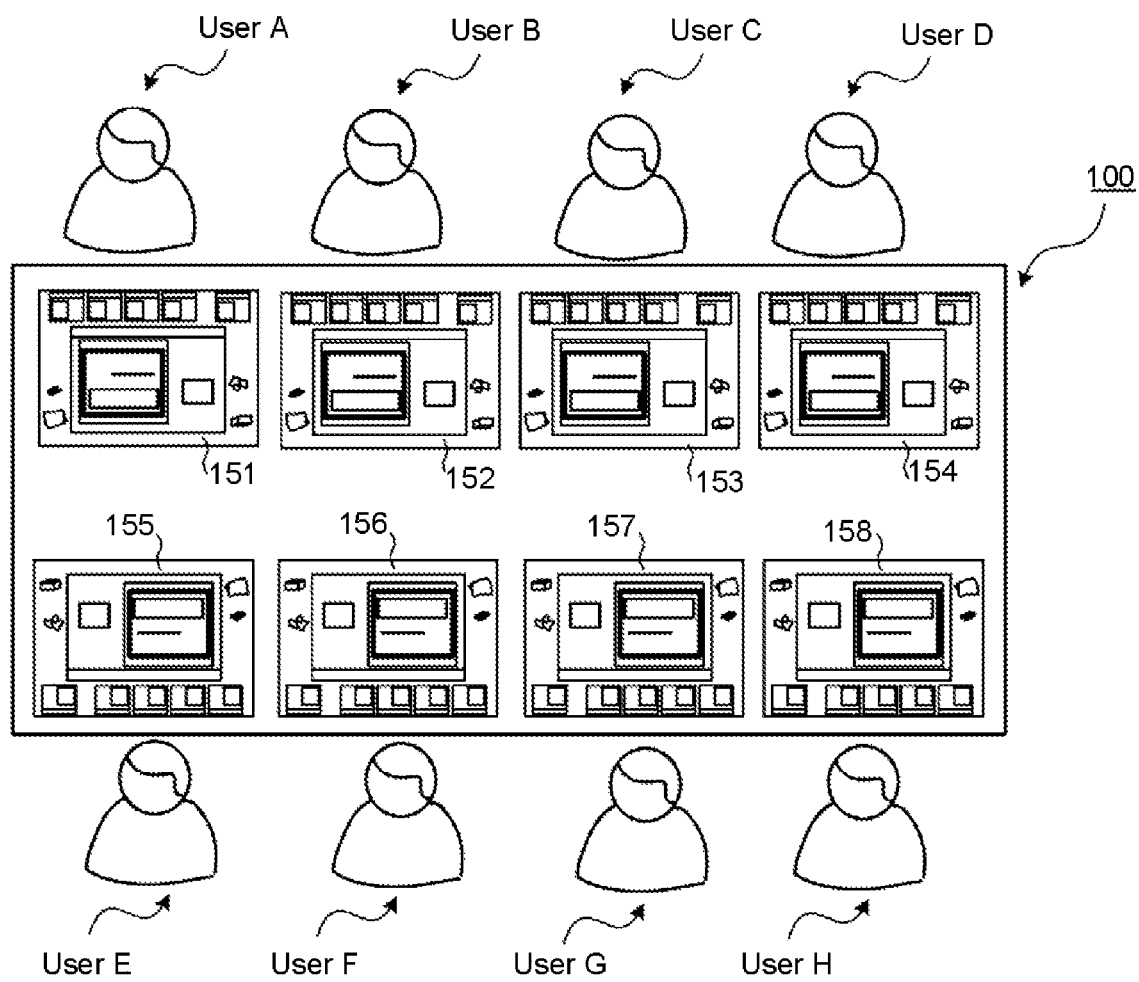
FIG. 3 is a diagram illustrating the correspondence relation between touch panel displays of the desktop information processing apparatus shown in FIG. 2 and users.

The correspondence relation between the touch panel displays 151-158 and users is shown in FIG. 3. That is, a user A uses the touch panel display 151, and a user B uses the touch panel display 152. Hereinafter, a user C to a user H use the touch panel displays as shown in FIG. 3. Further, seen from the direction of seated users, the display of the touch panel displays 151-158 is presented in a regular direction, but not in an upside-down manner.

Before a conference is started, the user A to the user H log in through a login authentication screen (not shown) displayed on the touch panel displays 151-158. The user passing the login authentication can participate in the conference. Thus, the correspondence relation between the users and the touch panel displays can be formed into data.

Figure 4:
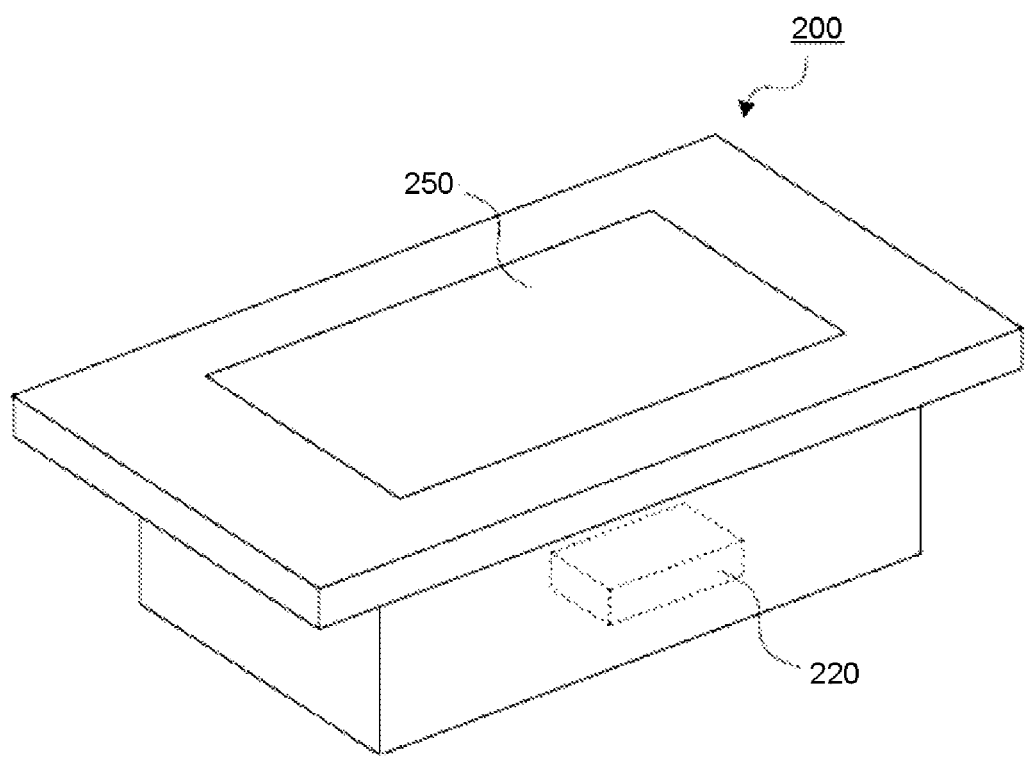
FIG. 4 is an oblique view illustrating an example of the configuration of a desktop information processing apparatus according to an embodiment.

FIG. 4 is a diagram illustrating the appearance of the desktop information processing apparatus 200 and a perspective view for a part of the desktop information processing apparatus 200. The desktop information processing apparatus 200, which is an information processing apparatus of a table type, has a big touch panel display 250 for operation display on the flat top plate surface thereof. The desktop information processing apparatus 200 comprises a control section 220 which serves as a computer system to control the display and the operation of the touch panel display 250.

Figure 5:
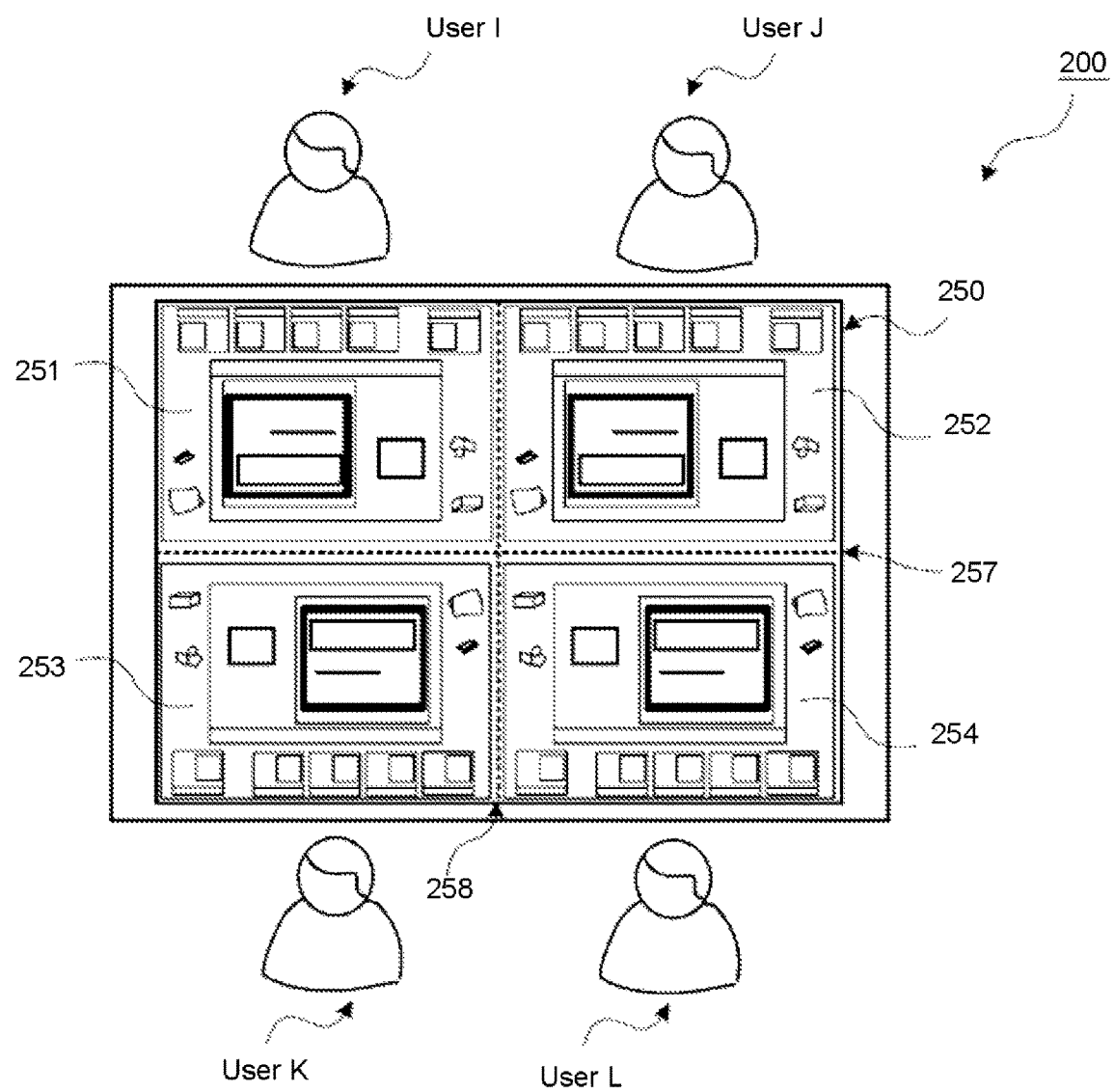
FIG. 5 is a diagram illustrating an example of the display of the desktop information processing apparatus shown in FIG. 4 and the correspondence relation between display areas and users.

FIG. 5 is a diagram illustrating the correspondence relation between an example of the display of the desktop information processing apparatus 200 and users. The desktop information processing apparatus 200 segments the display area of the touch panel display 250 into a plurality of areas for the display of different contents once a conference application is started to enter into a conference mode. FIG. 5 shows a state in which the display area is segmented into four areas. The user touches the touch panel display 250 with a fingertip or a pen point and moves the fingertip or the pen point without releasing the touch, thereby drawing lines 257 and 258 on the screen. In this way, segmented areas 251-254 are formed.

The user I to the user L use the areas designated to them in the segmented areas 251-254. In this example, the user I uses the area 251, the user J users the area 252, the user K users the area 253, and the user L uses the area 254. After the formation of the segmented area 251-254, the touch panel display 250 displays a screen for login authentication in each segmented area. The user I to the user L carries out a login authentication in the segmented areas 251-254, respectively. In this way, the correspondence relation between the segmented areas 251-254 and the users I-L is obtained.

Figure 6:
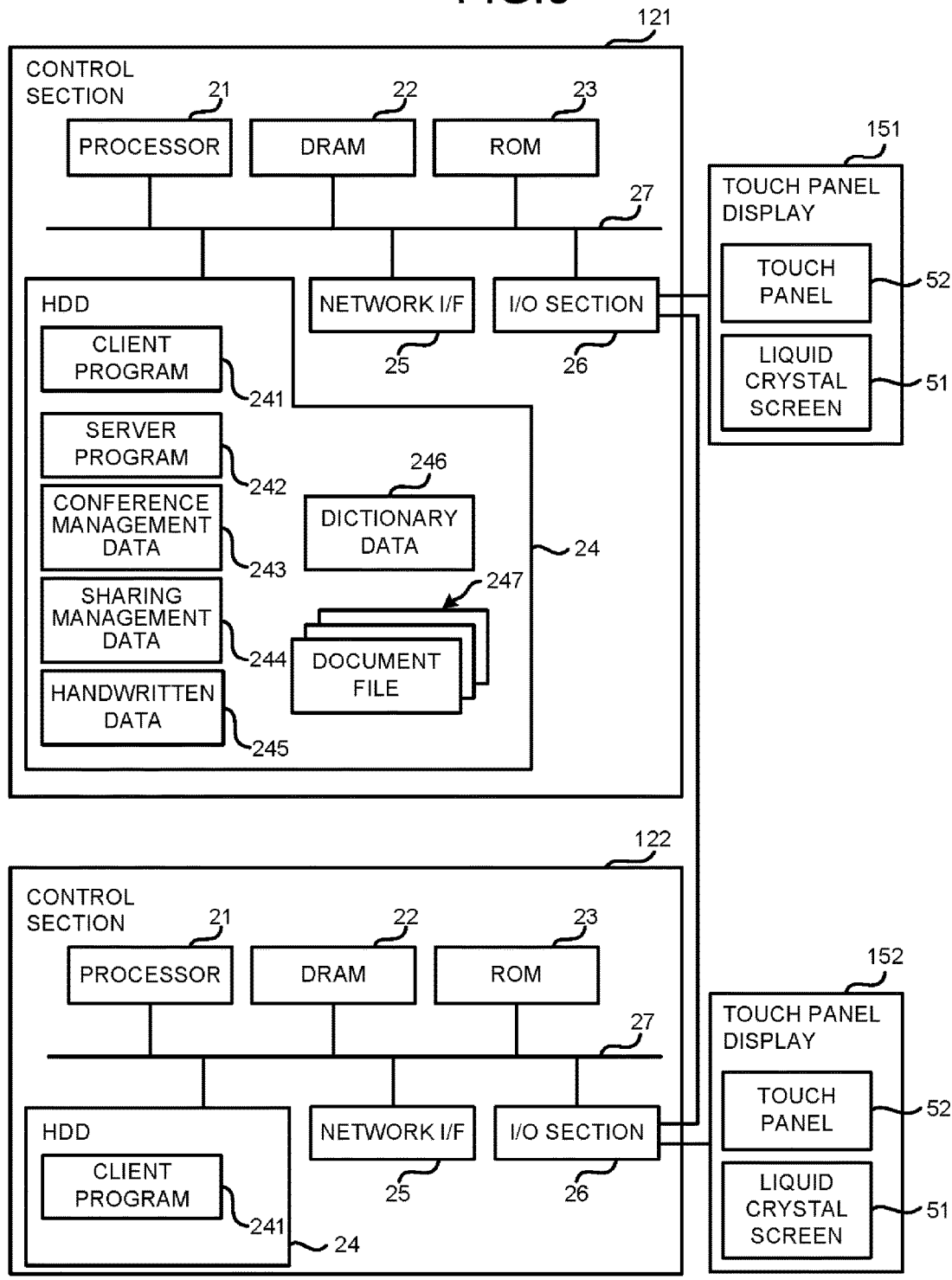
FIG. 6 is a block diagram illustrating an example of partial configuration of the desktop information processing apparatus.

FIG. 6 is a block diagram illustrating the internal configuration of the control section 121 and the touch panel display 151 and the internal configuration of the control section 122 and the touch panel display 152 of the desktop information processing apparatus 100.

Structurally identical to existing computers, the control section 121 comprises a processor 21, a DRAM (Dynamic Random Access Memory) 22, a ROM (Read Only Memory) 23, a HDD (Hard disk drive) 24, a network I/F (Interface) 25 and an I/O (Input/Output) section 26, which carry out data transmission/reception and the input/output of an instruction telegram and a signal via a system bus line 27.

The processor 21 is a CPU (Central Processing Unit) in this embodiment. The processor 21 develops the programs pre-stored in the HDD 24 and the ROM 23 in the DRAM 22 and carries out an operation according to the programs to control each device uniformly. The DRAM 22 is a primary storage device for volatile storage, and the ROM 23 stores system programs in a non-volatile manner. The HDD 24 stores data of the user using the desktop information processing apparatus 100 and the program used by the user.

The network I/F 25 is a device which is connected with the network 400 via the router 402 and carries out data transmission/reception with a machine outside the desktop information processing apparatus 100. In this case, the communication may be wired communication or wireless communication. The I/O section 26 outputs an instruction signal and telegram from the processor 21 to the touch panel display 151. Further, the I/O section 26 receives information (coordinate information) representing a touch position from the touch panel display 151 and then sends the information to the processor 21. The I/O section 26, which also takes charge of the data transmission/reception among the control sections 121-128, has a terminal in accordance with the USB (Universal Serial Bus) standard.

The touch panel display 151 comprises a touch panel 52 and a liquid crystal screen 51. The liquid crystal screen 51 is a flat liquid crystal screen the display surface of which is positioned on the top plate of the desktop information processing apparatus 100. The touch panel 52 is laminated on the display surface of the liquid crystal screen 51 to detect the touch of the user with a fingertip or pen point and then outputs the coordinate information of the detected position to the control section 121.

The control section 122 and the touch panel display 152 are identical to the control section 121 and the touch panel display 151 in hardware configuration but different from the control section 121 and the touch panel display 151 in the contents stored in the HDD 24. In this embodiment, a client-server structure is implemented, the control section 121 having server functions and client functions and the other control sections 122-128 and 220 only having client functions. In addition to a client program 241, the HDD 24 in the control section 121 also stores a program for achieving the server functions, that is, a server program 242, and data for achieving the server functions, that is, conference management data 243, sharing management data 244, handwritten data 245 and dictionary data 246. Further, the HDD 24 in the control section 121 also stores substance files of a document file 247 used in a conference. On the other hand, the control section 122 only having client functions merely stores the client program 241 in the HDD 24.

The other control sections 123-128 and the other touch panel displays 153-158 are structurally identical to the control section 122 and the touch panel display 152. Further, the control section 220 and the touch panel display 250 of the desktop information processing apparatus 200 are also structurally identical to the control section 122 and the touch panel display 152 shown in FIG. 6. In this example, as stated above, the control section 121 is described as a server, however, the other control sections 122-128 or 220 may serve as a server.

Next, examples of the display of and the operation on the touch panel displays 151-158 and the segmented areas 251-254 are described. In the following description, an example of the display of the touch panel display 151 used by the user A is mainly illustrated, and the display on the other touch panel displays is the same. Further, the facilitator (organizer) of a conference is described as the user A. The facilitator or organizer is referred to as a master.

Figure 7:
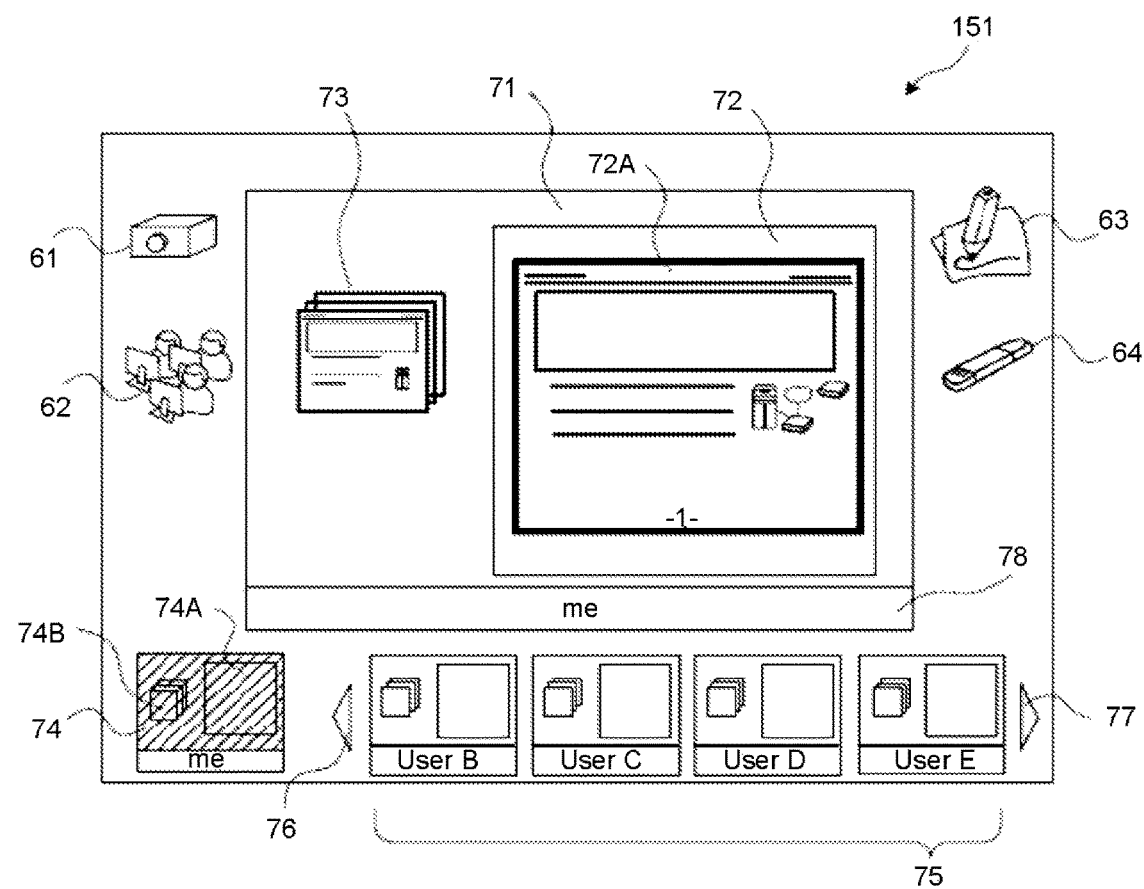
FIG. 7 is a diagram illustrating an example of the display according to the embodiment.

FIG. 7 is a diagram showing an example of the display of the touch panel display 151. In this example of the display of the touch panel display 151, each icon and the layout of each area are defined in advance. In the display area of the touch panel display 151, there is a presentation area 71 in the center and a projection icon 61, a share icon 62, a handwriting icon 63 and a USB (Universal Serial Bus) icon 64 at two sides of the presentation area 71. Below the presentation area 71, there is an area 74 for the thumbnail display of the document files prepared by a user (the user A, in this example). The area 74 is referred to as an own area 74. Below the presentation area 71, there is a list area 75 for the thumbnail display of the document files prepared by the other conference participants. The user operates (touches) arrow icons 76 and 77 to scroll the list area 75 horizontally to display the thumbnail images which cannot be displayed on one single screen. The area of the user currently giving a presentation is displayed in a highlighted manner in the own area 74 and the list area 75. The example shown in FIG. 7 shows that the user A is currently giving a presentation and the own area 74 is displayed in a highlighted manner.

The presentation area 71 is described below. A document file 72A currently explained by the presenter is displayed in an area 72, and the thumbnails of the other document files prepared by the current presenter are laminated and displayed in an area 73 beside the area 72. Further, the name of the user currently giving a presentation is displayed in an area 78 at the lower portion of the presentation area 71. Moreover, in the example shown in FIG. 7, as the user A using the touch panel display 151 is giving a presentation, 'me' representing the user A is displayed in the area 78.

The own area 74, the display in which is structurally identical to that in the presentation area 71, displays the currently opened document file in an area 74A and the other document files in an area 74B. Thumbnail images of the other users in the list area 75 are also displayed in the same way.

The other touch panel displays 152-158 and the segmented areas 251-254 also display contents in the way shown in FIG. 7, however, the own area 74, the list area 75 and the area 78 display the contents of its user. For example, on the touch panel display 152 currently used by the user B, thumbnail images of the document files of the user A are displayed in the list area 75, and the thumbnail images of the document files prepared by the user B are displayed in the own area 74. As the user A is currently giving a presentation, text 'user A' is displayed in the area 78. On the other hand, on the touch panel display 152 currently used by the user B, the display in the other areas 72 and 73 in the presentation area 71 is the same as that shown in FIG. 7. That is, the currently presented document file is displayed in the presentation area 71.

Next, user operations for implementing each function are described. Additionally, the reference numeral of an object needing no description is saved in each following accompanying drawing representing a display screen. Further, the operation of the user A on the touch panel display 151 is illustrated in each accompanying drawing except for FIG. 11.

Figure 8:
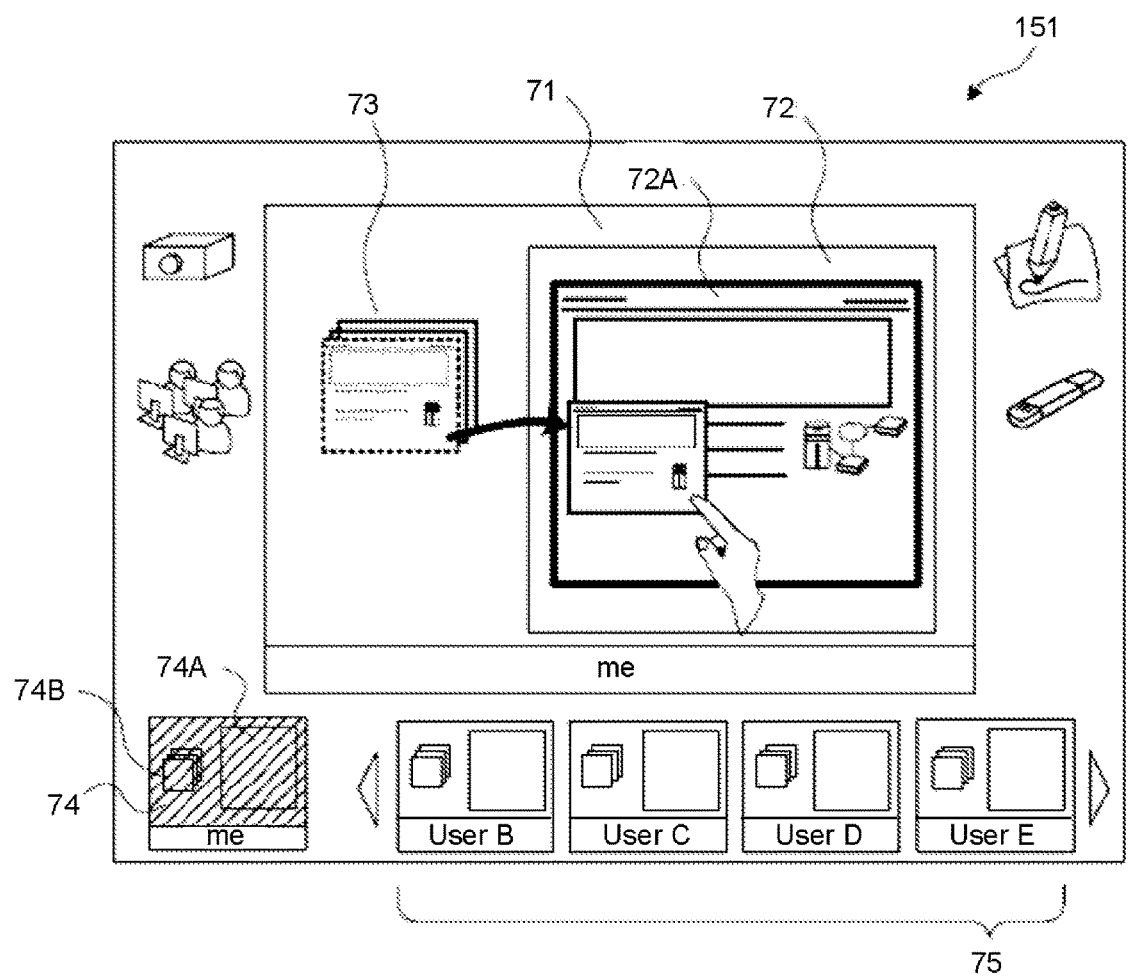
FIG. 8 is a diagram illustrating an example of an operation of turning a page of a document.
Figure 9:
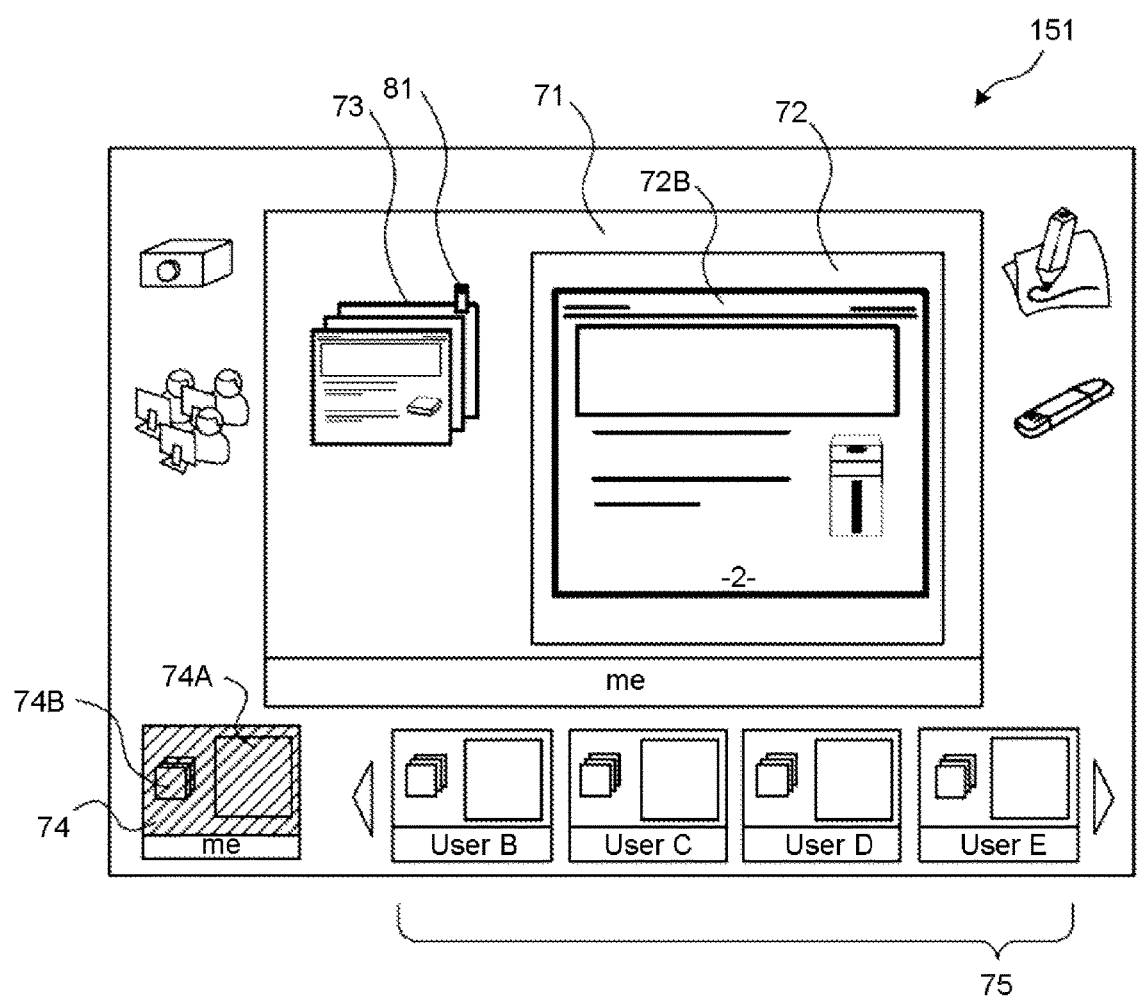
FIG. 9 is a diagram illustrating an example of the display after a page of a document is turned.

FIG. 8 shows an example of an operation of turning a page of a document file. On the touch panel display (the touch panel display 151 if the user A is the current presenter) used by the user currently giving a presentation, if the user touches the file in the area 73 with a fingertip or a pen point and moves the touched file to the area 72, then the control section 121 controls the display of the page turning. The state after the page turning is shown in FIG. 9. In the display presented after the aforementioned operation, a file 72B serving as the next page is displayed in the area 72. Further, the file 72A serving as former page is endowed with a mark 81 representing the top page and then becomes the last page in the area 73. If a page turning operation is carried out on the touch panel display used by the current presenter, then the page turning is displayed on all the touch panel displays 151-158 and in the segmented areas 251-254 in a linked manner. On the other hand, if a page turning operation is carried out on the touch panel display distributed to a user different from the current presenter, the page turning is only displayed on the touch panel display.

The page turning is also displayed in the own area 74. That is, the operations described with reference to FIG. 8 and FIG. 9 are carried out in the own area 74, thus, the page turning is also displayed in the areas 74A and 74B. A page turning operation may also be conducted on the thumbnails of the users in the list area 75. Further, when a page turning operation is carried out in the own area 74 and the list area 75, the change is only displayed on the touch panel display and but not on the other touch panel displays in a linked manner.

Figure 10:
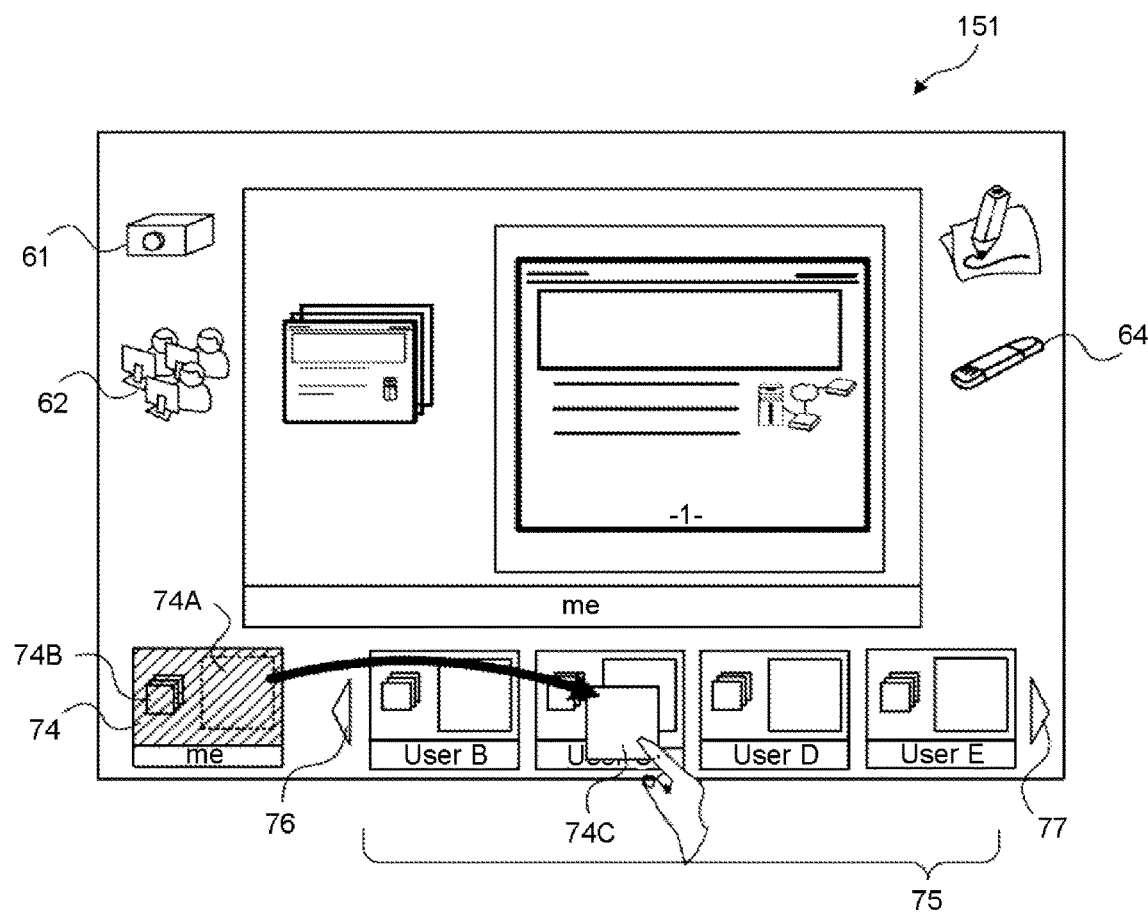
FIG. 10 is a diagram illustrating an example of a file distribution operation.

Next, the sharing and the copying of a document file are described with reference to FIG. 10. The user A touches the own area 74 and moves the touched content to the area of another participant in the list area 75, in this way, the control section 121 copies the document file prepared by the user A to a job area (a folder dedicated to a user) accessible to the another participant. The example shown in FIG. 10 shows that the user A touches the document file (hereinafter the file is referred to as a document file 74C) in the area 74A and distributes the document file to the user C. The document file 74C is copied to the job area of the user C through the operation. A page turning operation is carried out in the own area 74 through the operation described in FIG. 8 and FIG. 9 to display a desired document file in the area 74, and then the operation shown in FIG. 10 is carried out to merely distribute a desired file from all the document files prepared. To copy all the document files prepared by the user A into the job areas of the other participants together, the user A touches the other part of the own area 74 except the area 74A and moves the touched content to an distribution destination.

The distribution of a document file to a specific user is illustrated in FIG. 10, however, the document file 74C in the area 74A can be distributed to all the participants, that is, logged-in users, by touching the document file 74C and moving the document file 74C to the share icon 62. In this case, the document file 74C can be copied to the job area of each user or a job area sharable and accessible to all logged-in users, for example, a shared folder. Further, in the way described above, a user can copy all the files prepared by himself/herself into job areas of all the participants by touching the other part of the own area 74 except the area 74A and moving the touched content to the share icon 62.

By moving the document file 74C to the projection icon 61, the document file 74C can be sent to an electronic projector connected with the desktop information processing apparatus 100, and in a case where a USB memory is connected with the desktop information processing apparatus 100, the document file 740 can be sent (copied) to the USB memory by moving the document file 74C to the USB icon 64. All the document files prepared can be sent together in the same way.

Figure 11:
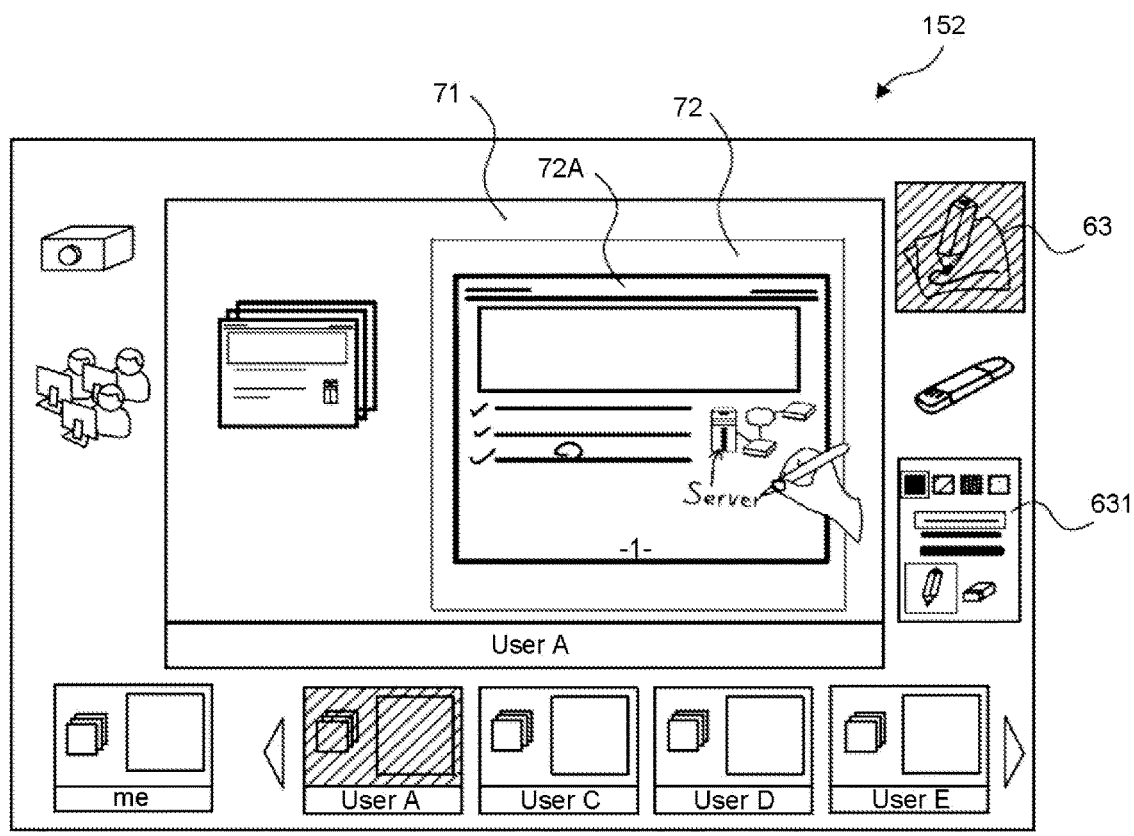
FIG. 11 is a diagram illustrating an example of the operation and the display when a handwritten note is made.

Then, a handwriting operation is described below with reference to FIG. 11. FIG. 11 shows an example of the display of the touch panel display 152 used by the user B and a condition where the user B carries out a handwriting operation on the document currently presented by the user A.

If the user B touches the handwriting icon 63, then, as shown in FIG. 11, the touch panel display 152 displays the area of the handwriting icon 63 in a highlighted manner and displays a toolbox screen 631 for handwriting. The user B selects a color and the category of a line from a toolbox screen 631 and determines whether to write or erase the existing written content. The touch panel display 152 detects a touch on the document file 72A and draw, due to a movement, with the color and the line designated in the toolbox screen 631 according to the track of the movement. The coordinate of the track is sent to the control section 121 and stored as handwritten data 245.

A drawing is drawn manually according to the track of the movement on the touch panel display 152 on which a handwriting operation is carried out, however, the hand drawing of the user B is not displayed on the other touch panel displays 151, 153-158 or in the segmented areas 251-254. The control section 122 conducts a control so that the hand drawing is carried out on the touch panel display 152, and the other control sections 121, 123-128 and 220 conduct a control so that no hand drawing is carried out on the touch panel displays 151, 153-158 or in the segmented area 251-254. Similarly, for example, if the aforementioned handwriting operation is carried out in the segmented area 251, then a drawing is drawn in the segmented area 251 but not on the other touch panel displays 153-158 or in the segmented areas 252-254. That is, the handwriting operation is only displayed on the touch panel display or in the segmented area used by the user carrying out the handwriting operation but not on the other touch panel displays or in the other segmented areas. Thus, the hand drawing can be processed as unique note information of the user carrying out the operation.

Further, the present invention may also be implemented as follows: in case where a handwriting operation is carried out on the touch panel display used by the user who is currently giving a presentation, the hand drawing is also drawn on the other touch panel displays. When the user A currently giving a presentation carries out the aforementioned handwriting operation on the touch panel display 151, the same hand drawing is carried out on the touch panel displays 152-158 and in the segmented areas 251-254. In this case, on the touch panel displays 152-158 and in the segmented areas 251-254, the color and the category of the lines selectable from the toolbox screen 631 are made different from those used by the user A in the hand drawing. Thus, a user can distinguish his/her drawings and notes from those of the user A.

Figure 12:
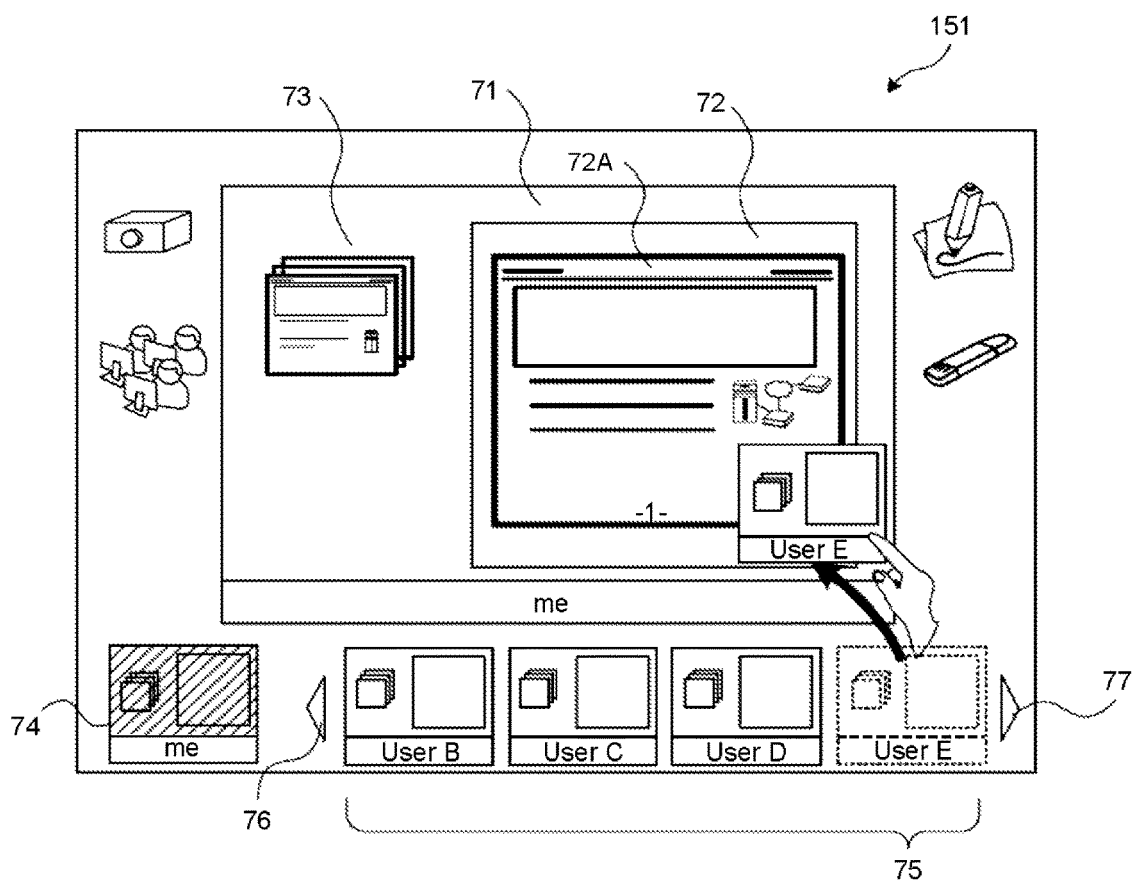
FIG. 12 is a diagram illustrating an operation of transferring a presentation right.
Figure 13:
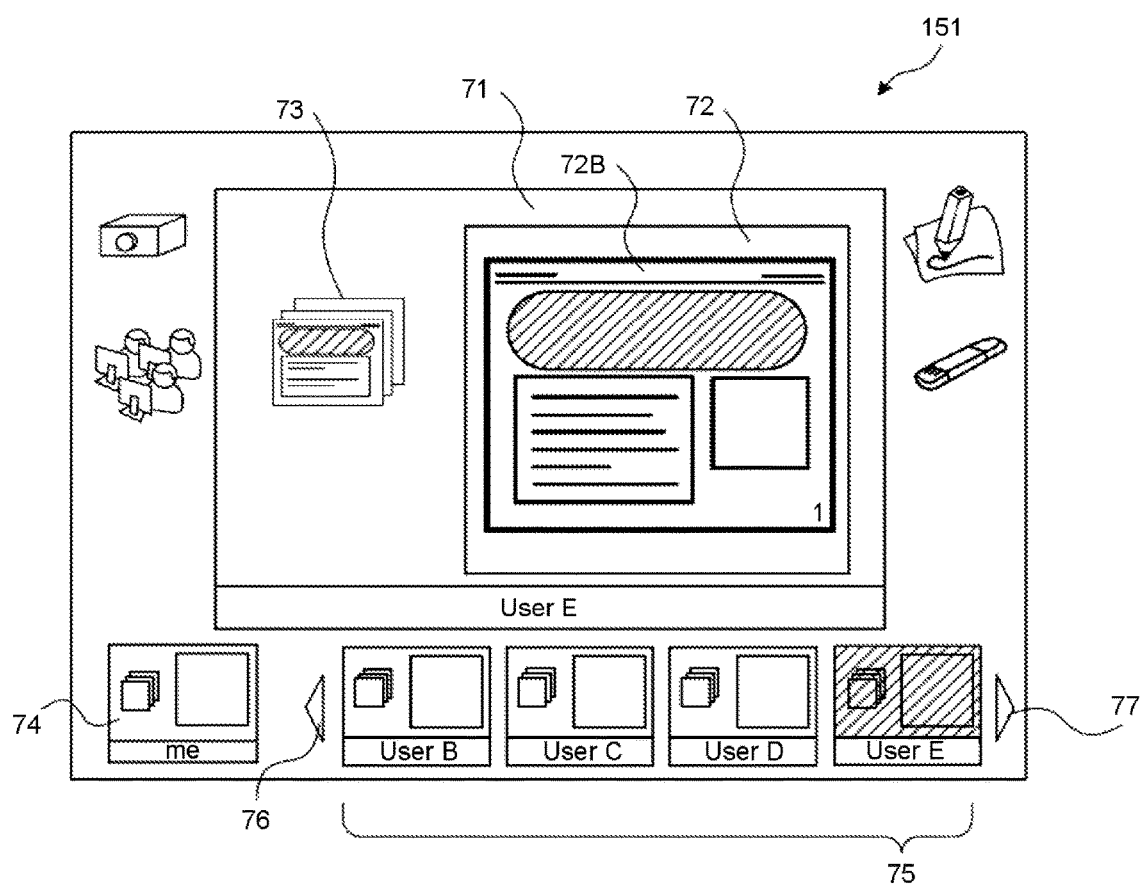
FIG. 13 is a diagram illustrating an example of the display after the transfer of a presentation right.

Next, the transfer of a presentation right is described with reference to FIG. 12. On the touch panel display used by the master in charge of a conference, the thumbnail images in the list area 75 are touched and moved to the presentation area 71, thereby displaying document files of the selected user in the presentation area 71. In the example shown in FIG. 12, if the user A serving as the master touches the thumbnail image of the user E on the touch panel display 151 and moves the touched thumbnail image into the presentation area 71, then, as shown in FIG. 13, the document file 72B of the user E is displayed in the presentation area 71. Through the operation, the document file 72B of the user E is not only displayed in presentation areas 71 of the touch panel display 151, but also displayed in presentation areas 71 of the other touch panel displays 152-158 and the segmented areas 251-254. Further, if the presentation right is transferred, then the thumbnail image of the user (the user E, in this example) to whom the presentation right is transferred in the list area 75 is displayed in a highlighted manner (referring to FIG. 13).

The transfer of the presentation right to a user in the list area 75 is only accepted on the touch panel display used by the master but not on touch panel displays of the other participants. On the other hand, apart from the master, the other participants can gain the presentation right by touching the thumbnail image in the own area 74 and moving the touched thumbnail image into the presentation area 71. In this case, all the touch panel displays 151-158 and all the segmented areas 251-254 display document files of the user gaining the presentation right in the presentation area 71.

Next, the data used by the desktop information processing apparatuses 100 and 200, that is, the conference management data 243, the sharing management data 244 and the handwritten data 245 are described. The data is stored in the HDD 24 of the control section 121 having server functions to be centrally managed by the control section 121. Further, the data, which is not limited to be stored in the HDD 24, may be stored in a device outside the system 1 or in any memory device as long as the data can be read from and written into the memory device.

Further, in the following accompanying drawings showing data tables, a hyphen '-' represents there being no value and a mark '. . .' represents a data which exists but is not recorded herein.

FIG. 14 is a diagram illustrating an example of the data structure of the conference management data 243. The conference management data 243 stores a 'user ID (Identification)' column 701, a 'language' column 702, a 'master' column 703, a 'terminal name' column 704, a 'presenter' column 705, a 'current file' column 706 and a 'document file' column 707 in association with each other. The user ID 701 is identification information of a conference participant user, which is obtained by the control section 121 when a user logs in. The language 702 is data representing the language daily used by the user. The language is obtained from a user management system outside the system 1. The master 703 is a column for identifying whether or not the user is the conference facilitator (master), in the column, 1 representing the master, and 0 representing the other participants rather than the master. The value in the 'master' column is the information registered in the system 1 by the user when a conference room is reserved. The terminal name 704 is a column representing which one of the operation display sections (touch panel displays 151-158, segmented areas 251-254) is currently used by the user, and the control section 121 obtains the terminal name by determining which one of the touch panel displays 151-158 and the segmented areas 252-254 is used by the user for login.

The presenter 705 is a column for identifying the user currently giving a presentation, in the column, 1 representing the user currently giving a presentation, and 0 representing the other users. The current file 706 is a column representing the currently opened document file. Herein, the opened file refers to the document file 72A shown in FIG. 7, the file displayed in the area 74A of the own area 74 and the document file displayed in the right column in each thumbnail image of the list area 75. The document file 707 is names of all the document files prepared by the user. The presenter 705 and the current file 706, once changed, are updated.

The conference management data 243 is described below in detail by taking the user A as an example. The user A who speaks English is the facilitator (master) of the conference and is currently using a touch panel display 151 the terminal name of which is C1. Further, the user A is currently giving a presentation and has prepared three files: sheet A1.ppt, sheetA2.ppt and sheetA3.ppt. The user A currently opens the file sheetA3.ppt.

Further, the order of the document files 707 is corresponding to the description order (page number) of the presentation. For example, in the presentation given by the user A, sheetA1.ppt is explained first, and then successively followed by sheetA2.ppt and sheetA3.ppt. The order of the document files in the area 73 and the area 74B in the own area 74 is accordant with the order so that a circular display is presented every time a page is turned. Further, by means of the order of the document files 707, each control section can know which document file is the initial page.

FIG. 15 is a diagram illustrating an example of the data structure of the sharing management data 244. The sharing management data 244 stores columns 'document file' 721, 'owner' 722 and 'sharer' 723 in association with each other. The document file 721 is the name of a document file shared. The owner 722 is the owner of the document file (the ID of the user preparing the file). The sharer 723 is the ID of the user distributed with the document file. If the operation shown in FIG. 10 is carried out, then the control section 121 generates each record of the sharing management data 244 based on the conference management data 243 shown in FIG. 14.

For the data shown in FIG. 15, if described in detail, the document file 'sheetA1.ppt', the owner of which is the user A, is respectively copied into the fixed job area of the user B and the user D. Further, the document file 'sheetA2.ppt', the owner of which is the user A, is distributed (copied) to all the participants. The distribution of the document file to all the participants can be easily achieved by moving the document file to the share icon 62. Further, in this embodiment, the document file which is not recorded in the share management data 244 represents that the document file is not distributed to another user.

FIG. 16 is a diagram illustrating an example of the data structure of the handwritten data 245. The handwritten data 245 includes an 'object ID' column 751, a 'user ID' column 752, a 'document file' column 753, a 'color' column 754, a 'line type' column 755 and a 'position information' column 756. The object ID 751 is a number generated by the control section 121 when the user draws. The user ID 752 is the ID of the user carrying out the handwriting operation, and the document file 753 is the name of the document file on which the user carries out the handwriting operation. The color 754 is the color of the hand-drawn image, and the line type 755 is the thickness (1 representing the minimum thickness and 3 representing the maximum thickness) of a line. The position information 756 is the coordinate of the track of the hand drawing. The control section 121 records the content from the moment the user touches (contacts) the touch panel displays 151-158 and the segmented areas 251-254 with a fingertip or a pen point to the moment the touch is removed (released) as one record.

The user ID 752 is obtained by determining which one of the touch panel displays 151-158 and the segmented areas 251-254 is operated by the user and then deriving the user ID 752 according to the correspondence relation between the user ID 701 and the terminal name 704 shown in FIG. 14. The document file 753, which represents the currently presented document file, can be derived according to the correspondence relation between the presenter 705 and the current file 706 shown in FIG. 14. The color 754 and the line type 755 can be derived according to the setting of the toolbox 631 shown in FIG. 11. The position information can be obtained by tracking the contact position of the fingertip or pen point of the user in real time.

An example of the operations carried out in the embodiment is described below with reference to FIG. 17 and FIG. 18. The desktop information processing apparatuses 100 and 200 described herein are of a client-server structure, as stated above. Client functions including a screen operation receiving function and a display control function are achieved through the execution of the client program 241 by the processor in each control section. Server functions are achieved using the data stored in the HDD 24 through the execution of the server program 242 by the processor 21 in the control section 121.

Figure 17:
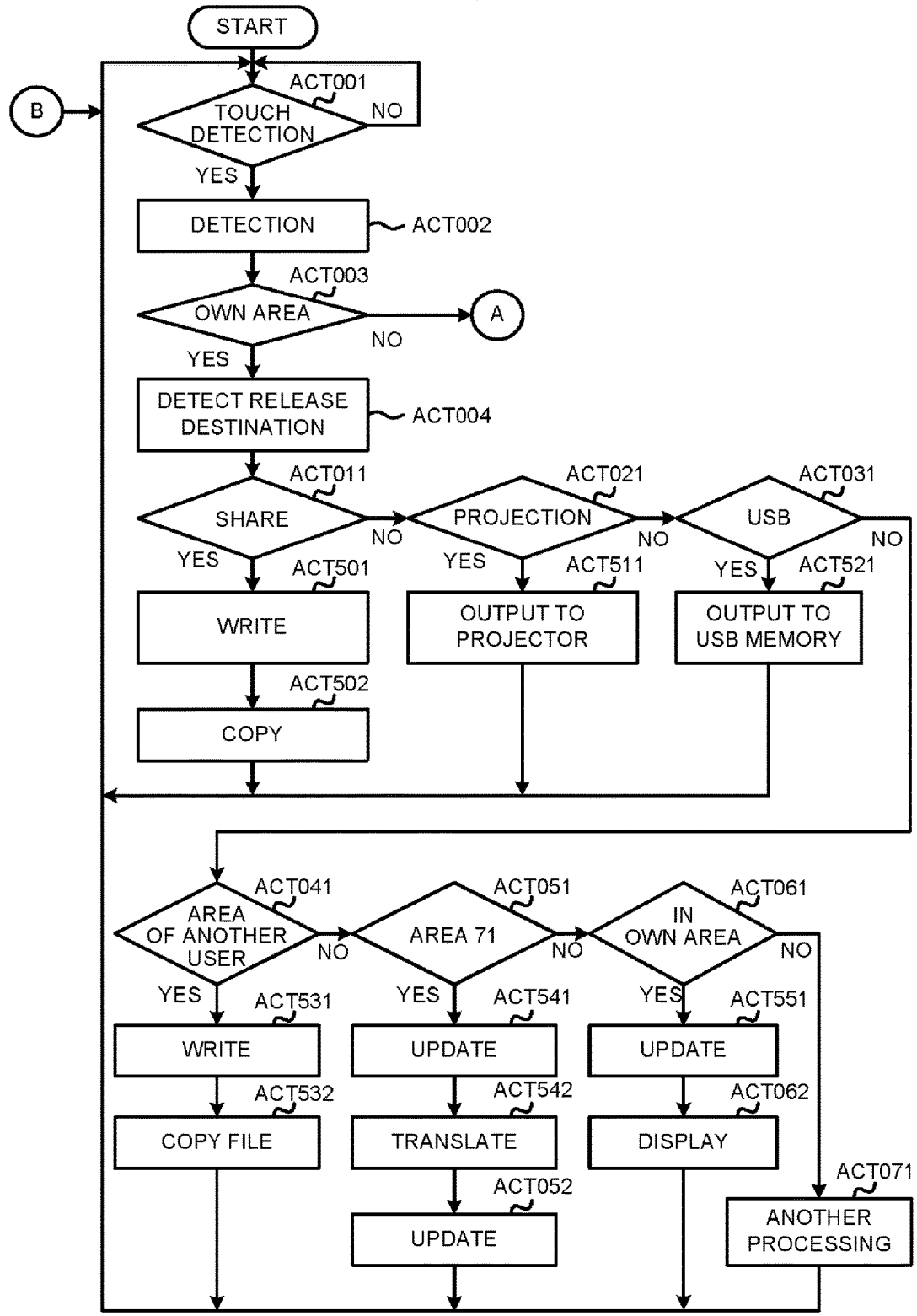
FIG. 17 is a flowchart illustrating an example of the operations carried out in an embodiment.
Figure 18:
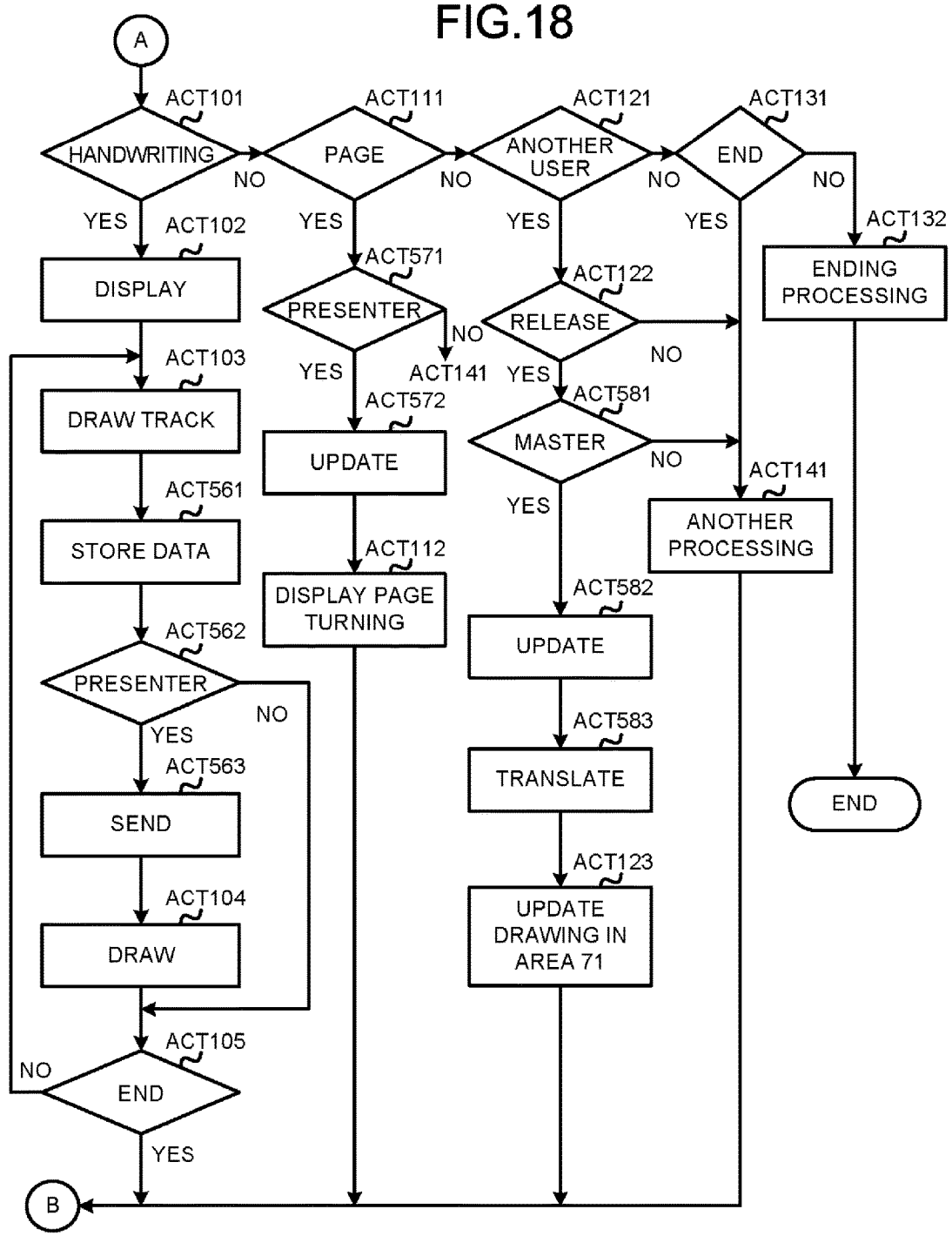
FIG. 18 is a flowchart illustrating an example of the operations carried out in an embodiment.

Further, client functions such as screen display and touch operation, although achieved by the touch panel display 152 and the control section 122 used by the user B in the flowcharts of FIG. 17 and FIG. 18, may also be achieved by the touch panel display and the control section used by another participant. Further, the operations represented by ACT number starting with 5 are carried out according to a code instruction of the server program 242 of the control section 121, and the operations representing by the other ACT numbers are carried out according to a code instruction of the client program 241.

The control section 122 waits until the user touches the touch panel display 152 (loop of NO in ACT 001). When the touch panel display 152 is touched (YES in ACT 001), the control section 122 detects what the touched object is (ACT 002).

If the touched object is an object in the own area 74 (YES in ACT 003), then the control section 122 detects the position where the moving fingertip leaves (ACT 004). Hereinafter, the position where the contact of a fingertip is released is called a release destination.

If the release destination is the share icon 62 (YES in ACT011), the control section 121 adds a record into the share management data 244 (ACT 501). The control section 121 receives, from the control section 122, information and instruction information of the document file (hereinafter referred to as a touched file) corresponding to the object detected in ACT 002. The instruction information refers to information representing the type of the processing carried out and herein to the value information indicating a processing of distributing to all the users; after receiving the information, the control section 121 specifies the owner of the touched file by reference to the owner 722 contained in the conference management data 243. Then, the control section 121 records the touched file, the owner and user IDs of all the participants into the share management data 244 in an associated manner. The control section 121 copies the touched file to job areas of all the participants (ACT 502) The processing in ACT 011, ACT 501 and ACT 502 in a case of only sharing one document file is the same with that in a case of sharing all the prepared document files.

When the release destination is the projection icon 61 (YES in ACT 021), the control section 121 receives, from the control section 122, information and instruction information of the touched file and outputs the touched file detected in ACT 002 to a projector (ACT 511).

When the release destination is the USB icon 64 (ACT 031 YES in), the control section 121 receives, from the control section 122, information and instruction information of the touched file, specifies the file from the document file 247 stored in the HDD24 and writes the file into a connected USB memory.

When the release destination is the area of a specific user (area of another user) in the list area 75 (YES in ACT 041), the control section 121 writes data into the sharing management data 244 (ACT 531). The control section 121 receives, from the control section 122, information and instruction information of the touched file and the user ID of the release destination and records the touched file, the owner and the user ID of the release destination in the sharing management data 244 in an associated manner. The control section 121 copies the touched file into the job area of the user of the release destination (ACT 532). Ina case of sharing all the prepared document files, but not only one document file, with other users, the processing in ACT 041, ACT 531 and ACT 532 is also carried out.

When the release destination is in the presentation area (YES in ACT 051), the control section 121 updates the presenter 705 in the conference management data 243 to the user carrying out the operation (the user B, in this example) (ACT 541). More specifically, the control section 121 sets the ID of the user who had been giving a presentation from 1 to 0 and then updates the presenter 705 by setting the ID of the user who is to give a presentation from 0 to 1.

Further, the control section 121 acquires, from the HDD 24, substance data (document file 247) of the document file of the user who is to give a presentation by reference to the 'document file' column 707 in the conference management data 243, and then extracts text data from the document file to carry out translation (ACT 542). If the acquired document file 247 is recorded in English, the control section 121 translates the document file 247 into the language used by the participant using the dictionary data 246 by reference to the language 702 in the conference management data 243. In this example, as the users I, J and K use Japanese and the user K uses French, the control section 121 translate the document file from English to Japanese and French. The translation conversion can be carried out using existing technologies. Further, when the acquired document file 247 is written in another language, the document file 247 is converted as well. Further, in a case of image data, in addition to text data, the text information contained in the image is also extracted from the image using an OCR technology and then translated.

The control section 121 sends the ID of the user who is to give a presentation, the document file 247, the translated data and the data in the 'current file' column 706 to the client program 241 being executed in the control section 121 and the control sections 122-128 and 220. For the document file, data representing a page sequence is also sent.

The control section 122 receiving the data updates the display in the presentation area 71 (ACT 052). That is, the control section 122 conducts a control to display the document file corresponding to the data in the current file 706 in the area 72 and display the document file in the area 73 based on the page sequence of the document file. The control section 122 conducts a control to display the mark 81 representing the initial page shown in FIG. 9 as needed, further, the control section 122 conducts a control to display the thumbnail image of the user in the list area 75 in a highlighted manner. The touch panel display 152 provides a display under the control.

Further, when the release destination is in the own area 74 (YES in ACT 061), in a case where the document file is moved from an area different from the area 74A into the area 74A, the control section 122 controls the turning of a page. The control section 121 receives instruction information from the control section 122 and updates the 'current file' column 706 in the conference management data 243 (ACT 551). The control section 122 controls the touch panel display 152 to display the page turning (ACT 062).

When the release destination is not in the own area 74 (NO in ACT 061), another defined processing is carried out (ACT 071), or no operation is carried out if no operation is defined. Then, the flow returns to ACT 001. Further, after each aforementioned function is implemented, that is, after ACT 502, ACT 511, ACT 521, ACT 532, ACT 052 and ACT 062 are carried out, the flow returns to ACT 001.

Return to the determination in ACT 003. If the touched area detected is not the own area 74 in ACT 003 (NO in ACT 003), then ACT 101 shown in FIG. 18 is carried out. The control section 122 determines whether or not the touched area is on the handwriting icon 63 (ACT 101). If the touched position is on the handwriting icon 63 (YES in ACT 101), the control section 122 controls the touch panel display 152 to display a toolbox 631 (ACT 102). The control section 122 controls the touch panel display 152 to draw in the area 72 according to the track of the fingertip or pen point of the user (ACT 103). The control section 122 draws the track with the color and the line selected in the toolbox 631. The ID of the user carrying out the operation, the color and the line type and the coordinate of the track are sent to the control section 121 every time the fingertip or the pen point leaves the touch panel display 152 to release the contact. The control section 121 receives the data, endows the data with an object ID in an associated manner and then registers the data into the handwritten data 245 (ACT 561).

The control section 121 determines whether or not the drawing user is the presenter by reference to the presenter 705 in the conference management data 243 (ACT 562). If the user is not the presenter (NO in ACT 562), the flow proceeds to ACT 105. If the user is the presenter (YES in ACT 562), the coordinate of the track is sent to the control sections 122-128 and 220 (ACT 563). The control sections 122-128 and 220 receiving the coordinate of the track display the hand drawing of the presenter in the area 72 of the presentation area 71 (ACT 563). At this time, each control section draws using the color and the line selected from the toolbox 631 which are different from those of the hand drawing of the presenter. The processing in ACT 563 and ACT 104 is carried out in an implementation where when the presenter carries out a hand drawing, the hand drawing is also carried out on the other touch panel displays. For example, if the handwriting icon 63 is touched again to end the operation (YES in ACT 105), the processing returns to ACT 001 but not proceeds circularly, and if the operation is not ended (NO in ACT 105), the flow returns to ACT 103.

In the case of a page turning operation, that is, the area 73 in the presentation area 71 is touched and the touch is released in area 72 (YES in ACT 111), the control section 121 receives the ID and the instruction information of the user touching the area 73 and determines whether or not the user touching the area 73 is the presenter by reference to the presenter 705 in the conference management data 243 (ACT 571). If the user is the presenter (YES in ACT 571), the control section 121 updates the current file 706 in the conference management data 243 to the file of the next page (ACT 572). The control section 121 sends the value of the updated current file 706 to the client program 241 in the control section 121 and to the control sections 122-128 and 220. The control section 122 controls the touch panel display 152 to display the page turning based on the data received (ACT 112).

Further, if the user turning the page is not the presenter (NO in ACT 571), then another processing is carried out in the present embodiment (ACT 141), however, it may also be such an implementation where the page turning is only displayed on the touch panel display used by the user turning the page.

If the thumbnail image of another user in the list area 75 is touched by the user (YES in ACT 121) and then released in the presentation area 71 (YES in ACT 122), the control section 121 determines whether or not the user carrying out the operation is the master by reference to the master 703 in the conference management data 243 (ACT 581). If the user is the master (YES in ACT 581), the control section 121 updates the presenter 705 in the conference management data 243 such that the selected user becomes the next presenter. The control section 121 translates the data in the document file 247 (ACT 583). The translation processing is the same as that carried out in ACT 542. Sequentially, the control section 121 sends the ID and the document file 247 of the user appointed to be the next presenter, the translated data and the data in the 'current file' column 706 to the client program 241 being executed in the control section 121 and the control sections 122-128 and 220. For the document file, data representing a page sequence is also sent.

The control sections 121-128 and 220 receiving the data updates the display in the presentation area 71 (ACT 123). The processing in ACT 123 is the same as that in ACT 052. Further, another defined processing is carried out (ACT 141) if the touch is not released in the presentation area 71 (NO in ACT 122) or the user is not the master (NO in ACT 581).

If the object touched by the user is not the thumbnail image of another user in the list area 75 (NO in ACT 121), it is determined whether or not the operation is ended (ACT 131). The control section 122 determines whether or not the operation is ended according to whether or not a predefined button is pressed or according to other conditions. If the operation is not ended (NO in ACT 131), another processing is carried out (ACT 141) If the operation is ended (YES in ACT 131), the control section 122 executes an ending processing (ACT 132) to end this flowchart.

In the present embodiment, the handwritten data 245 is stored permanently, further, the control section 121 further controls the access to each record so that the other users except the user (user ID: 752) writing the handwritten data 245 cannot access the handwritten data 245. The control section 121 converts all the data stored as handwritten data 245 into image data by carrying out a specific operation after the conference is ended. In this case, an image file is created by the combination of the user ID 752 and the document file 753 in the handwritten data 245. In the example shown in FIG. 16, the record in which an object ID is 6 and the record in which an object ID is 7 form an image file. The control section 121 draws according to the color, the line type and the position information recorded in the record in which an object ID is 6 and the color, the line type and the position information recorded in the record in which an object ID is 7 to create an image file. In this way, a hand-drawn image is generated for each user carrying out a writing operation and for each document file. The control section 121 outputs the image file to the job area folder of the user ID. Thus, participant users can refer to hand-drawn images at any time. Further, when distributed with substance data of a document file, the user can overlap the document file with the hand-drawn image and confirms the document file.

Further, the conference management data 243 and the share management data 244 can also be permanently stored as history data.

The operation display section is equivalent to the touch panel displays 151-158 in this embodiment and, in a case of the touch panel display 250, is equivalent to each individual segmented area 251, 252, 253 or 254. The control section is equivalent to the control sections 121-128 and 220 in this embodiment, however, several of or all of the control sections 121-128 and 220 may be combined into a control section. The first display area is equivalent to the area 71 or 72 in this embodiment.

In the present embodiment, the functions for achieving the present invention are prerecorded in the apparatus, however, the present invention is not limited to this, the same functions may also be downloaded to the apparatus from a network or stored in a recording medium and then installed in the apparatus. The recording medium may be of any form as long as the recording medium is capable of storing programs like a CD-ROM and is readable by an apparatus. Further, the functions achieved by an installed or downloaded program can also be achieved through the cooperation with an OS (Operating System) in the apparatus.

According to the present embodiment, a brief meeting or a conference can be held in which information is shared smoothly. Further, compared with the conventional conference during which the participants can only see the content displayed on a projector at a distance, proposals can be shared without diminishing the thinking ability of participants.

Further, according to this embodiment, handwritten note information can be acquired, which saves the effort and time consumed in the preparation of paper documents.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. A desktop information processing apparatus allowed to be simultaneously used by a plurality of users, comprising:
   a processor; and
   a memory that stores executable instructions that, when executed by the processor, facilitate performance of operations, comprising:
   respectively detecting touch operations of a plurality of users from a plurality of operation display sections, which are allocated to each user of the plurality of users and include a display surface on a top plate of the desktop information processing apparatus;
   displaying same file data in a pre-defined first display area on all the operation display sections and displaying, when a user carries out a touching and moving operation on the file data on one of the plurality of operation display sections, a track of a movement on a touched operation display section but not on other operation display sections, displaying focus data corresponding to a current page of a document in the first display area, displaying other data corresponding to pages of the document in the first display area so as to be laminated and displaying a mark at a top page of the document in the displayed laminated other data, wherein the mark is displayed at the top page of the document in relationship to a page turning operation in which a position of the top page of the document in an order of the displayed laminated other data is changed;
   simultaneously displaying the first area, a second area, and a third area respectively in each display of the plurality of operation display sections, wherein a first document file associated with a first user is a currently presented document file that is displayed in the first area, a thumbnail corresponding to an own document file associated with a given user of each operation display section is displayed in the second area of each display of the plurality of operation display sections including a thumbnail of a second document file associated with a second user displayed in the second area on an operation display section corresponding to the second user, and a plurality of thumbnails corresponding to document files associated with each user of the plurality of users is displayed in the third area of each display of the plurality of operation display sections including a thumbnail of a third document file associated with a third user displayed in the third area on all the operation display sections, and wherein the third user is different from the second user;
   in response to the first user having a presentation right in the first area and further in response to the first user dragging the thumbnail of the third document file from the third area to the first area on an operation display section corresponding to the first user, moving the presentation right from the first user to the third user associated with the third document file and displaying the third document file associated with the third user in the first area on all the operation display sections; and
   in response to the first user having the presentation right in the first area and further in response to the second user dragging the thumbnail of the second document file from the second area to the first area on the operation display section corresponding to the second user, the second user acquiring the presentation right from the first user and displaying the second document file associated with the second user in the first area on all the operation display sections.

2. The desktop information processing apparatus according to claim 1, wherein the operations further comprise
   storing position information representing the track of the movement in a storage section for each user touching one of the operation display sections and for each file data displayed in the first display area.

3. The desktop information processing apparatus according to claim 1, wherein the operations further comprise
   if the file data displayed in a first display area is a file prepared by a first user touching the first display area, displaying a movement track of the touch of the first user on all the operation display sections.

4. The desktop information processing apparatus according to claim 3, wherein the movement track is a first movement track and the touch is a first touch, and wherein the operations further comprise
   differentiating the display of the first movement track of the first touch of the first user from that of a second movement track of a second touch of the other users.

5. The desktop information processing apparatus according to claim 1, wherein the operations further comprise
   displaying, for each user, file data prepared by each user in a size smaller than that displayed in the first display area.

6. The desktop information processing apparatus according to claim 5, wherein the operations further comprise
   if the operation display section allocated to a first user of the plurality of users detects a touch on the file data prepared by the first user and a movement to the first display area, displaying the file data moved by the first user in the first display area on all the operation display sections.

7. The desktop information processing apparatus according to claim 6, wherein the operations further comprise
   displaying a display area of the file data prepared by the first user in a highlighted manner on all the operation display sections.

8. The desktop information processing apparatus according to claim 5, wherein the operations further comprise if the operation display section allocated to the first user of the plurality of users detects a touch on one of file data separately displayed for each user and a movement to the first display area, determining whether or not the first user is an organizer based on the information stored in the storage section and displaying the file data moved by the first user in the first display area on all the operation display sections if the first user is the organizer.

9. The desktop information processing apparatus according to claim 8, wherein the operations further comprise
displaying the display area of the file data prepared by the first user in a highlighted manner on all the operation display sections.

10. The desktop information processing apparatus according to claim 5, wherein the operations further comprise
if the operation display section allocated to the first user of the plurality of users detects a touch on the file data prepared by the first user and a movement to file data of another user, copying the file prepared by the first user into a storage area which is accessible to the another user.

11. The desktop information processing apparatus according to claim 5, wherein
if the operation display section allocated to the first user of the plurality of users detects a touch on the file data prepared by the first user and a movement to a specific image, copying the file data prepared by the first user into a storage area accessible to all the plurality of users.

12. A display method for a desktop information processing apparatus comprising a processor and a memory and having a plurality of operation display sections, including:
respectively detecting touch operations of a plurality of users from the plurality of operation display sections, which are allocated to each user of the plurality of users and include a display surface on a top plate of the desktop information processing apparatus;
displaying same file data in a pre-defined first display area on all the operation display sections;
conducting a control to display, when a user carries out a touching and moving operation on the file data on one of the plurality of operation display sections, a track of a movement on a touched operation display section but not on other operation display sections, display focus data corresponding to a current page of a document in the first display area, display other data corresponding to pages of the document in the first display area so as to be laminated and display a mark at a top page of the document in the displayed laminated other data, wherein the mark is displayed at the top page of the document in relationship to a page turning operation in which a position of the top page of the document in an order of the displayed laminated other data is changed;
simultaneously displaying the first area, a second area, and a third area respectively in each display of the plurality of operation display sections, wherein a first document file associated with a first user is a currently presented document file that is displayed in the first area, a thumbnail corresponding to an own document file associated with a given user of each operation display section is displayed in the second area of each display of the plurality of operation display sections including a thumbnail of a second document file associated with a second user displayed in the second area on an operation display section corresponding to the second user, and a plurality of thumbnails corresponding to document files associated with each user of the plurality of users is displayed in the third area of each display of the plurality of operation display sections including a thumbnail of a third document file associated with a third user displayed in the third area on all the operation display sections, and wherein the third user is different from the second user;
in response to the first user having a presentation right in the first area and further in response to the first user dragging the thumbnail of the third document file from the third area to the first area on an operation display section corresponding to the first user, moving the presentation right from the first user to the third user associated with the third document file and displaying the third document file associated with the third user in the first area on all the operation display sections; and
in response to the first user having the presentation right in the first area and further in response to the second user dragging the thumbnail of the second document file from the second area to the first area on the operation display section corresponding to the second user, the second user acquiring the presentation right from the first user and displaying the second document file associated with the second user in the first area on all the operation display sections.

* * * * *